(12) United States Patent
Ikunami

(10) Patent No.: US 8,256,065 B2
(45) Date of Patent: Sep. 4, 2012

(54) HINGE MECHANISM FOR DISPLAY DEVICE

(75) Inventor: Takahiro Ikunami, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 78 days.

(21) Appl. No.: 12/989,993

(22) PCT Filed: Apr. 9, 2009

(86) PCT No.: PCT/JP2009/001659
§ 371 (c)(1),
(2), (4) Date: Oct. 28, 2010

(87) PCT Pub. No.: WO2010/001511
PCT Pub. Date: Jan. 7, 2010

(65) Prior Publication Data
US 2011/0061195 A1  Mar. 17, 2011

(30) Foreign Application Priority Data
Jul. 2, 2008  (JP) .................................. 2008-173646

(51) Int. Cl.
*E05D 11/08* (2006.01)
(52) U.S. Cl. .......................................................... 16/342
(58) Field of Classification Search ..................... 16/342, 16/337, 225; 361/679.08, 679.11, 679.02, 361/679.15, 679.27; 455/90.3, 575.1, 575.3, 455/575.8; 379/433.12, 433.13; 348/373, 348/333.01, 333.06, 794
See application file for complete search history.

(56) References Cited

U.S. PATENT DOCUMENTS

| | | | | |
|---|---|---|---|---|
| 2,458,707 | A * | 1/1949 | Jacobs | 296/97.11 |
| 4,785,500 | A * | 11/1988 | Langridge | 16/297 |
| 6,230,365 | B1 * | 5/2001 | Lu | 16/342 |
| 6,470,532 | B2 * | 10/2002 | Rude | 16/335 |
| 7,096,534 | B2 * | 8/2006 | Wang et al. | 16/284 |
| 7,958,600 | B2 * | 6/2011 | Kuo et al. | 16/342 |
| 2002/0092130 | A1 * | 7/2002 | Tseng et al. | 16/342 |
| 2006/0124816 | A1 | 6/2006 | Okahara | |
| 2006/0265839 | A1 * | 11/2006 | Lu | 16/342 |
| 2006/0272128 | A1 * | 12/2006 | Rude | 16/342 |

FOREIGN PATENT DOCUMENTS

| | | |
|---|---|---|
| JP | 6-58231 U | 8/1994 |
| JP | 2001-41227 A | 2/2001 |
| JP | 2006-105275 A | 4/2006 |
| JP | 2006-168402 A | 6/2006 |
| JP | 2006-282100 A | 10/2006 |

* cited by examiner

*Primary Examiner* — Chuck Y. Mah
(74) *Attorney, Agent, or Firm* — Birch, Stewart, Kolasch & Birch, LLP

(57) ABSTRACT

A hinge mechanism for a display device is arranged such that a cylindrical holder 14 which encloses the outer peripheral portion of a shaft 13 projecting laterally from a display 3 has a protrusion 19 provided on the internal surface thereof, and also the shaft 13 has provided on the outer peripheral surface thereof a plurality of flat faces 20, 21, and 22 for engaging with the protrusion 19.

2 Claims, 5 Drawing Sheets

HINGE MECHANISM FOR DISPLAY DEVICE

TECHNICAL FIELD

The present invention relates to a hinge mechanism for rotatably supporting a display of a display device.

BACKGROUND ART

Passenger cars in recent years include one having provided therein a display device for a television, DVD, game, and so on intended for a rear seat occupant. In a vehicle including three-row seats or opposed seats, a display device is mounted on a ceiling thereof. Such a display device consists of a display device main body and a display (monitor) that can be rotated with respect to the main body. The display is used with held at a predetermined angle with respect to the display device main body.

The display is rotatably supported by a hinge mechanism supporting a shaft provided on the display with a bracket fixed on the side of the display device main body. In a conventional type hinge mechanism, the shaft of a display is rotatably passed through a bracket, and the bracket is fixed on the side of a display device main body. In order to position the display at a predetermined open position, a click plate having a convexity is provided on the shaft, and two or more concavities of the convexity of the click plate to be fit in are provided on the bracket side. In order to position and fix the click plate on the shaft, a spacer or the like is employed. Further, in order to hold the shaft on the bracket, a holding member is provided at the end portion of the shaft.

Since a large number of members are required for a typical type of hinge mechanism as described above, a hinge structure disclosed in Patent Document 1 is proposed with the objective of reducing the number of components. The hinge structure is arranged as follows: a bracket section; a hinge piece part formed continuous to the bracket section and having a turned-out piece part that is formed turned-out in a double folding direction; and a shaft holder section formed on the turned-out piece part in the hinge piece part and rotatably clamping a shaft integral with a display are integrally formed with an elastic member, and the hinge piece part and the turned-out piece part are fastened to each other to impart torque to the shaft (rotation shaft) of the display in the shaft holder section.

PRIOR ART DOCUMENTS

Patent Documents

Patent Document 1: JP-A-2006-282100

The hinge mechanism disclosed in Patent Document 1 has a structure where a display is formed integral by an opening and closing hinge structure; a user moves the display to any desired angle by hand and retains the open angle of the display, with a certain load imparted on the shaft of the display by the turned-out piece part of the elastic member that is gripping the shaft. In the structure, there is a problem such that the operational force in the opening and closing is heavy since a load for holding the display is normally imposed on the display rotation shaft.

The present invention has been made to solve the above-mentioned problems, and an object of the present invention is to hold a display at a predetermined angle only, such that no load is imposed on the shaft of the display at any angle other than the predetermined angle.

SUMMARY OF THE INVENTION

The hinge mechanism for a display device according to the present invention is characterized in that a cylindrical holder that encloses the outer peripheral portion of a shaft projecting laterally from a display has a protrusion provided on the internal surface thereof, and also the shaft has provided on the outer peripheral surface of the shaft a positioning engaging section for engaging with the protrusion.

According to the hinge mechanism for a display device according to the present invention, it is configured such that the holder supports the shaft and that also the engagement of the protrusion formed on the holder with the positioning engaging section provided on the shaft side makes a positioning thereof. Thus, in an engaging state between the protrusion and the positioning engaging section, a large holding force can be exerted, while in the other positions the protrusion comes in contact with the circular arc portion of the shaft, thus lightening the rotation operation of the display and also reducing the number of components.

BEST MODE FOR CARRYING OUT THE INVENTION

Embodiments of the present invention will now be described with reference to the accompanying drawings in order to explain the present invention in more detail.

First Embodiment

Figure 1:
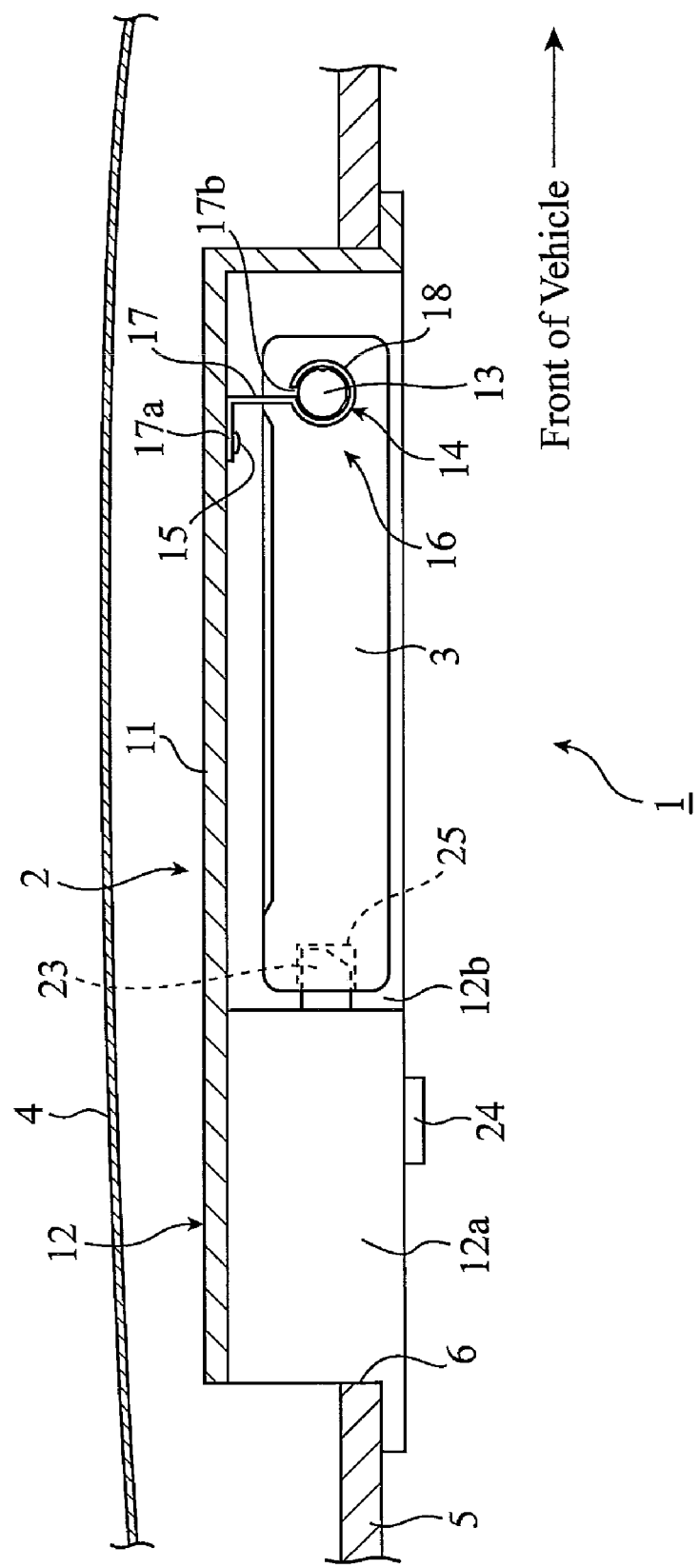
FIG. 1 is a schematic sectional view taken along a side of a display device including a hinge mechanism in accordance with a first embodiment with a display thereof closed.
Figure 2:
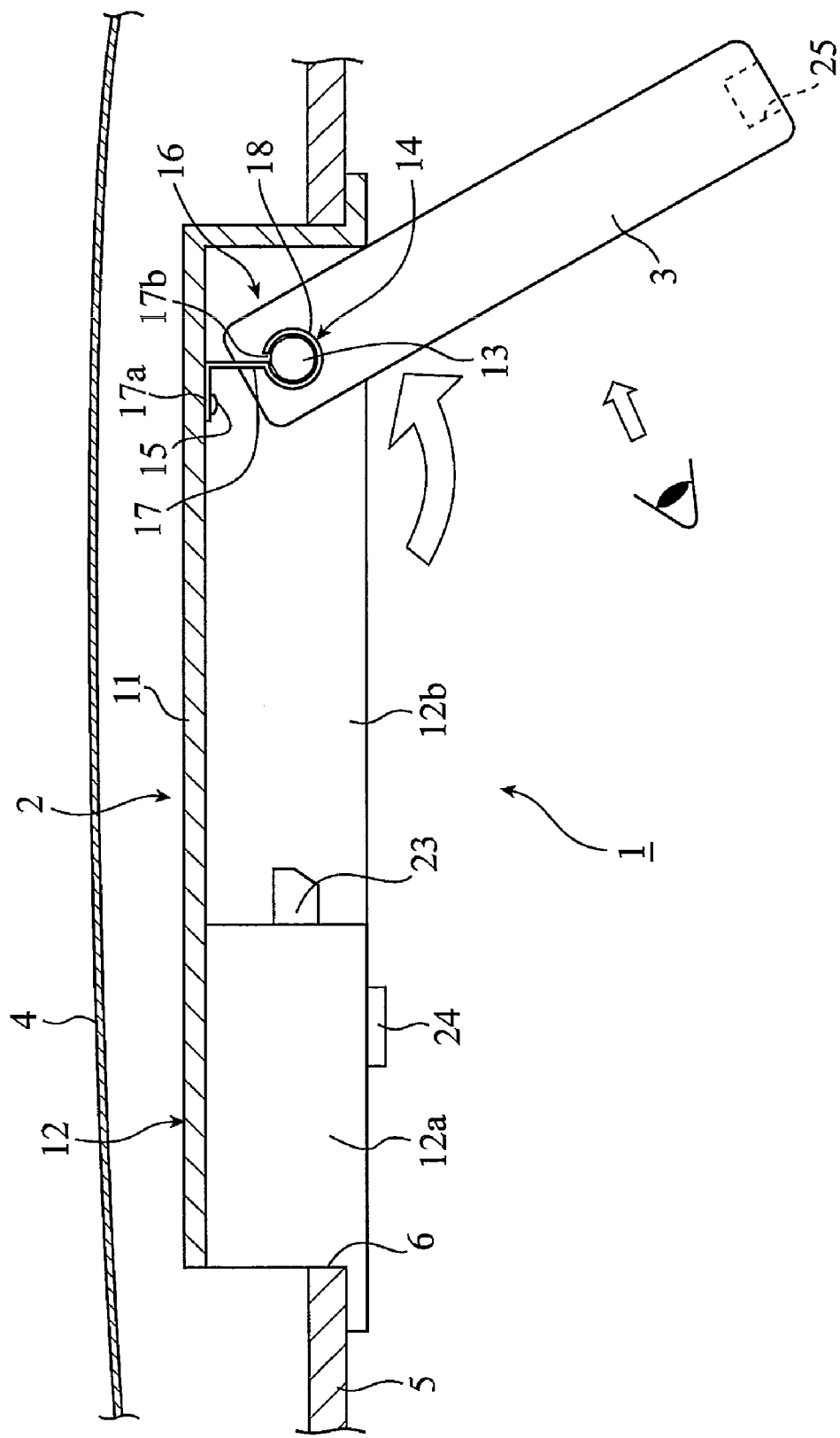
FIG. 2 is a schematic sectional view taken along the side of the display device including the hinge mechanism in accordance with the first embodiment with the display thereof closed.
Figure 3A:
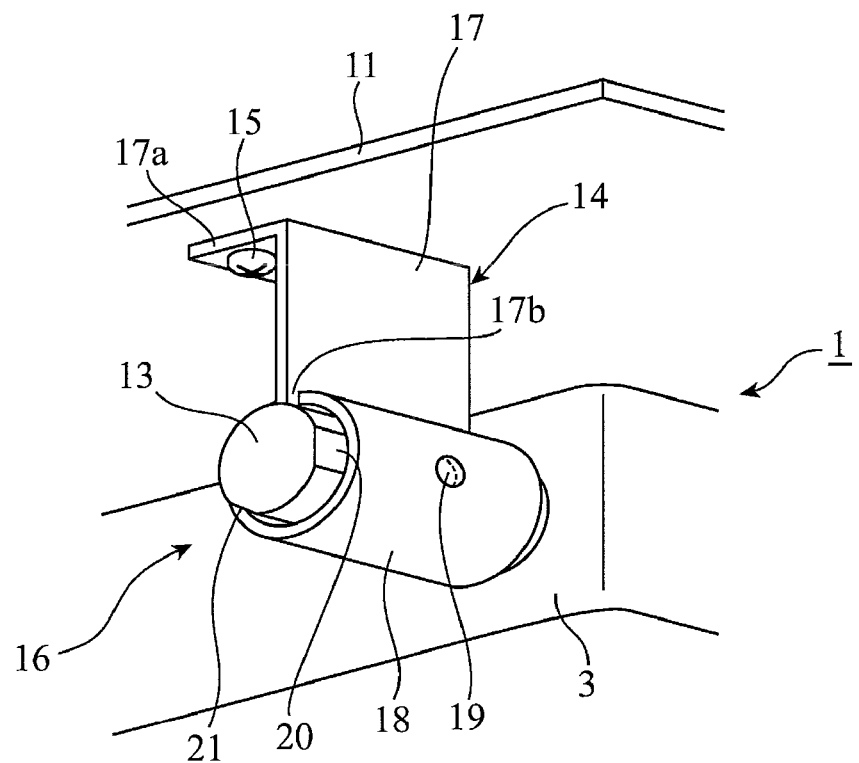
FIG. 3A is a perspective view of the hinge mechanism in accordance with the first embodiment.
Figure 3B:
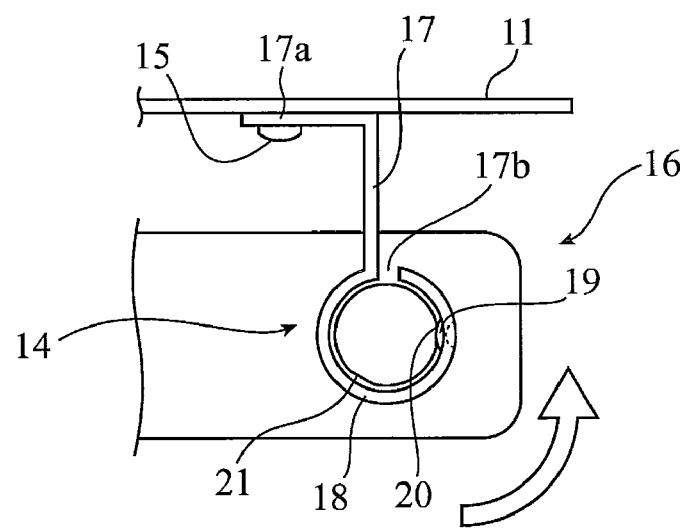
FIG. 3B is a side view of the hinge mechanism shown in FIG. 3A.
Figure 3C:
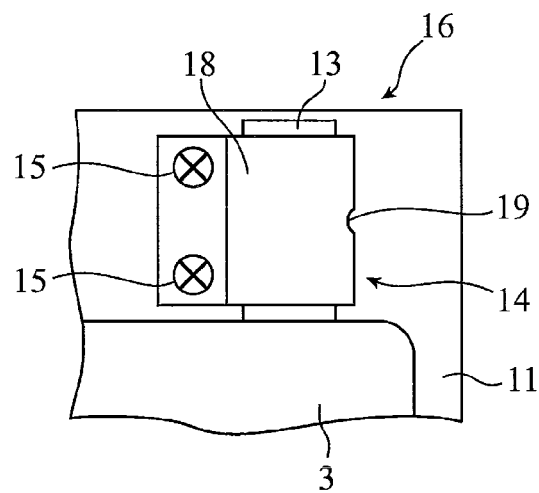
FIG. 3C is a plan view of the hinge mechanism shown in FIG. 3A.

In the first embodiment, the present invention is applied to a display device mounted on the ceiling of a vehicle. FIG. 1 and FIG. 2 are schematic sectional views taken along the side of a display device in accordance with the first embodiment with the display thereof opened and closed, respectively. FIG. 3A is a perspective view of a hinge structure thereof, FIG. 3B is a side view thereof, and FIG. 3C is a plan view thereof.

As shown in FIG. 1 and FIG. 2A, a display device 1 is composed of a display device main body 2 and a display 3 assembled openably and closably to the display device main body 2. The display device 1 is installed on a roof lining 5 inside a roof 4 of the vehicle. The display device is mounted by fitting and screwing the display device main body 2 in a mounting hole 6 provided through the roof lining 5, or using an equivalent method.

The display device main body 2 has a structure such that equipments (a controller and so on) required for the display device 1 are assembled to a metallic base 11 to be covered with an inner cover 12. The inner cover 12 is composed of an equipment housing section 12a for covering the equipments on the base 11 and a concave display housing section (space) 12b for housing the display 3. The inner cover 12 is molded of, e.g., a plastic or the like.

The display 3 has a shaft 13 projecting laterally from both sides of the base section thereof, and the shaft 13 is supported rotatably by a holder 14. The holder 14 is fixed to the base 11 of the display device main body 2 with screws 15. The shaft 13 and the holder 14 constitute a hinge mechanism 16 for enabling the display 3 to be rotated.

The holder 14 constituting the hinge mechanism 16 is made by plastic-working an elastic material such as sheet metal, and as shown in FIGS. 3A, 3B, and 3C, the holder is composed of an L-shaped leg 17 of which one end constitutes an attaching portion 17a to the base 11, and a cylindrical shaft supporting section 18 formed integral with the other end portion of the leg 17. The shaft supporting section 18 does not have a completely cylindrical shape, and is arranged to have a clearance 17b between the supporting section and the end portion of the leg 17 to exert an elastic force. The shaft 13 is passed through the shaft supporting section 18 to be supported therein.

The shaft supporting section 18 has a protrusion 19 projecting from the inner side thereof. The protrusion 19 is formed, e.g., by imparting an impacting blow against the shaft supporting section 18 from outside to cause the portion to inwardly project. In the first embodiment, the protrusion 19 is formed in the direction of the central axis, which is horizontal (in the states shown in FIG. 3A and FIG. 3 B), and passes through the center of the shaft supporting section 18.

On the other hand, a 0 degree engaging face 20 and a 120 degree engaging face 21 are formed on the shaft 13 as positioning engaging sections in the position corresponding to the protrusion 19: in a state where the display 3 is housed in the display housing section 12b of the inner cover 12; and in a state thereof opened 120 degrees, respectively. These engaging faces 20, 21 are formed by cutting away the outer peripheral surface of the shaft 13 to form flat faces thereon. The diameter and so on of the cylindrical shaft supporting section 18 are determined such that the protrusion 19 can exert an elastic force which enables to retain the display 3 in the state where the protrusion 19 abuts against the engaging faces 20, 21.

When the display 3 is opened and set to the position of 120 degrees, the 120 degree engaging face 21 of the shaft 13 abuts against the protrusion 19 of the shaft supporting section 18, and thereby the display 3 is positioned and held in the state opened 120 degrees (FIG. 2). When the display 3 is closed to be housed in the display housing section 12b of the inner cover 12, the 0 degree engaging face 20 of the shaft 13 abuts against the protrusion 19, and the display 3 is held in the accommodation state (FIG. 1).

A latch 23 is provided from the equipment housing section 12a of the inner cover 12 toward the display housing section 12b. The latch 23 is configured to be elastically retractable by a spring. An operating button 24 is provided on the surface of the equipment housing section 12a, and the latch 23 is configured to be retracted into the equipment housing section 12a by pushing the operating button 24. On the other hand, a latch engaging hole 25 is provided at the end face of the rotation side of the display 3. When the display 3 is closed, the latch 23 is fit into the latch engaging hole 25 to hold the display 3. The operating button 24 is pushed to draw the latch 23 from the latch engaging hole 25, thus enabling the display 3 to rotate.

Figure 4:
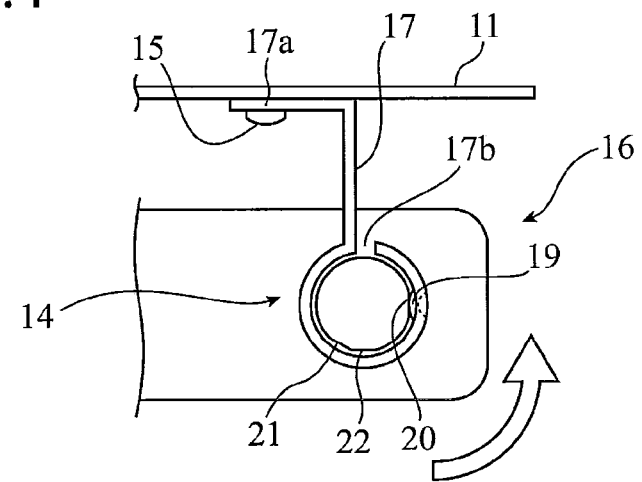
FIG. 4 is a side view similar to FIG. 3B of an example in which the number of engaging faces of the first embodiment as shown in FIGS. 3A, 3B and 3C is increased.

The engaging face, provided on the shaft 13, for making a positioning when the display 3 is opened does not have to be limited to the single 120 degree engaging face 21, and the number of the engaging face can be increased. FIG. 4 illustrates an example of providing a 90 degree engaging face 22. When the display 3 is opened to engage the 90 degree engaging face 22 of the shaft 13 with the protrusion 19 of the holder 14, the display 3 can be retained in the state opened 90 degrees. An operator can select an open angle (90 degrees or 120 degrees) according to the operator's posture and the like.

It should be appreciated that the positional relation between the protrusion 19 of the shaft supporting section 18 of the holder 14 and the engaging faces 20, 21, 22 of the shaft 13 is not limited the above-described one; if given positional relations, e.g., the closed state of the display 3, the state thereof opened 90 degrees, and the state thereof opened 120 degrees, can be secured, the protrusion and the engaging faces can be disposed at any place.

The hinge mechanism 16 of the display device in accordance with the first embodiment has a structure where the whole inner peripheral surface of the holder 14 does not surroundingly support the whole outer peripheral surface of the shaft 13, and only the protrusion 19 abuts on the outer peripheral surface of the shaft 13. Thus, an operational force upon rotation of the display 3 may be small, and thereby, there is no heavy feeling in such an operation, which may give an excellent operational feeling. Also, in the closed state and the predetermined opened state of the display 3, the protrusion 19 can engage with the engaging faces 20, 21, 22 each having a flat face, which provides a strong holding force. Furthermore, due to the reduced number of components and the simple structure, the number of assembling steps are simplified to improve the productivity, and further contribute to a cost reduction thereof. Since the elongate engaging faces 20, 21, and 22 are provided on the shaft 13 side in connection with the local protrusion 19 on the holder 14 side, a delicate positioning in the axial direction on the shaft between the both becomes unnecessary to facilitate the assembly also in this respect.

Second Embodiment

Figure 5A:
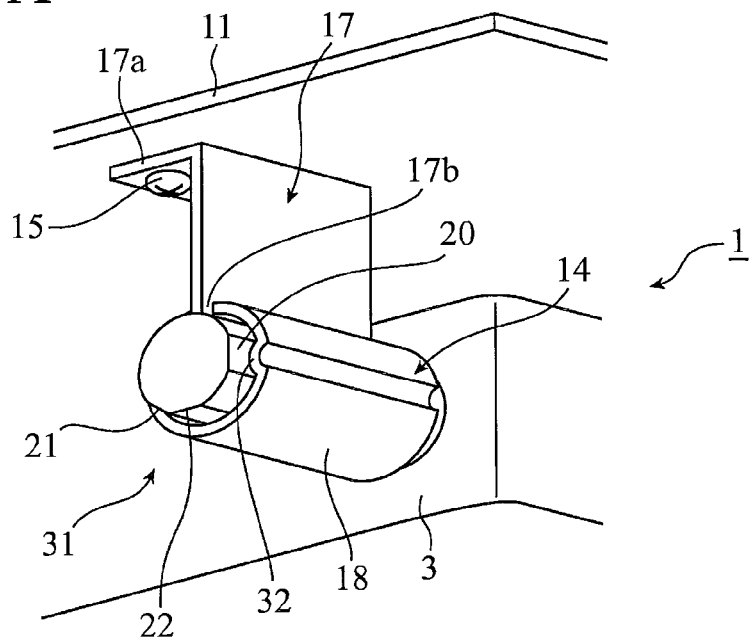
FIG. 5A is a perspective view of a hinge mechanism in accordance with a second embodiment.
Figure 5B:
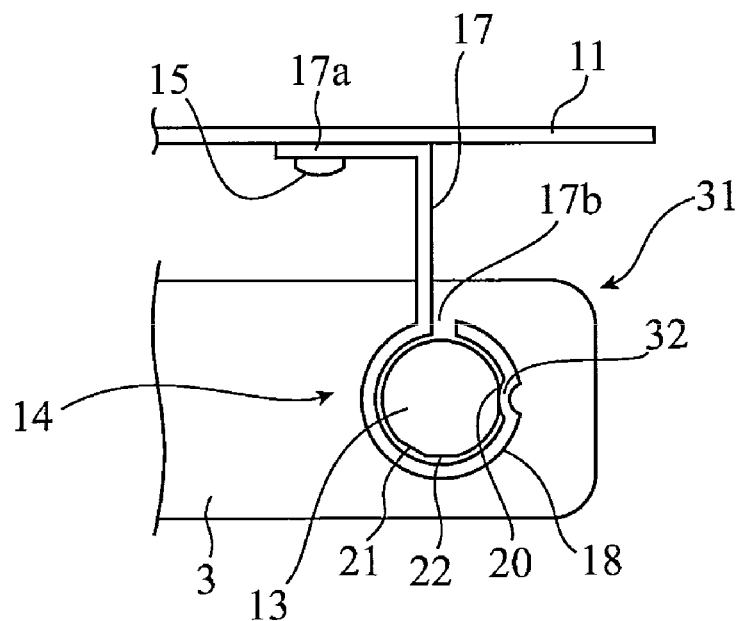
FIG. 5B is a side view of the hinge mechanism shown in FIG. 5A.
Figure 5C:
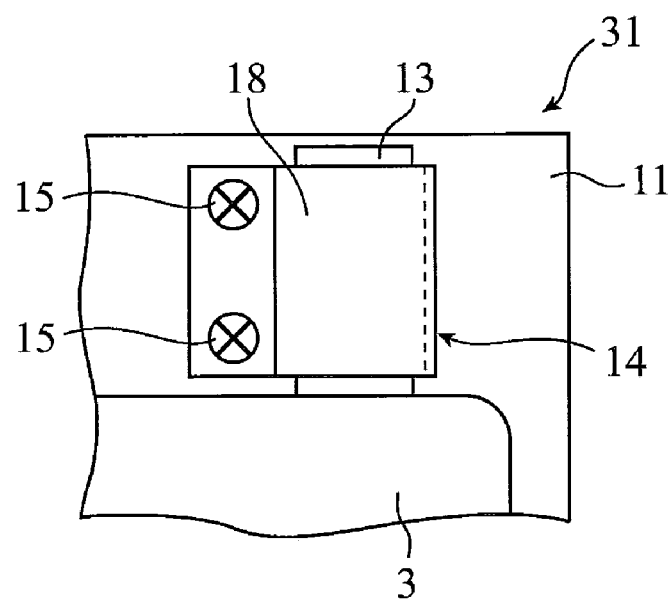
FIG. 5C is a plan view of the hinge mechanism shown in FIG. 5A.

FIGS. 5A, 5B, and 5C show a perspective appearance, a side, and a bottom of a hinge mechanism 31 for a display device in accordance with the second embodiment, respectively. The hinge mechanism 31 has a structure where a protrusion to be provided on a holder 14 is provided by a rib-shaped protrusion 32 along the entire length of the holder 14. The rib-shaped protrusion 32 is formed, e.g., by a plastic working such as pressing. A 0 degree engaging face 20, a 120 degree engaging face 21 and a 90-degree engaging face 22 as engaging sections are provided on the side of a shaft 13, as in the case of FIG. 4.

In the hinge structure 31, a display 3 is opened or closed, and the 0 degree engaging face 20, the 120 degree engaging face 21 or the 90-degree engaging face 22 of the shaft 13 is abutted against the rib-shaped protrusion 32 provided on the side of the holder 14, thus positioning and holding the display 3 in each of the positions.

According to the display device of the second embodiment, as in the hinge mechanism 16 of the first embodiment, the display device has a structure where the whole inner peripheral surface of the holder 14 does not surroundingly support the whole outer peripheral surface of the shaft 13, and only the rib-shaped protrusion 32 abuts against the outer peripheral surface of the shaft 13. Thus, an operational force upon rotation of the display 3 may be small, and thereby, there is no heavy feeling in such an operation, which may give an excellent operational feeling. Due to the reduced number of components and the simple structure, the number of assembling steps are simplified to improve the productivity, and further contribute to a cost reduction thereof. Due to the engagement of the rib-shaped protrusion 32 on the holder 14 side with the engaging faces 20, 21, and 22 each having a flat face on the shaft 13 side, a delicate positioning in the axial direction on the shaft between the both becomes unnecessary. Furthermore, the protrusion is provided by the rib-shaped protrusion 32, and thus the contact area between the protrusion and the flat engaging faces 20, 21, and 22 on the shaft 13 side is enlarged to increase a positioning holding force thereof.

In the first and second embodiments discussed above, the positioning engaging section provided on the shaft 13 side is defined by the flat faces 20, 21, and 22; however, the positioning engaging section may have a concavity which engages with the protrusion 19 on the holder 18 side, not necessarily having a flat face. When the concavity is provided by a somewhat elongated one, not having a width equal to that of the protrusion 19, an alignment with the protrusion 19 can be facilitated during the assembly.

INDUSTRIAL APPLICABILITY

As discussed above, in order to hold a display at a predetermined angle only, not imposing a load on the shaft of the display at an other-than-predetermined angle, the hinge mechanism for a display device according to the present invention is arranged such that a cylindrical holder which encloses the outer peripheral portion of the shaft projecting laterally from the display has a protrusion provided on the internal surface thereof, and also the shaft has provided on the outer peripheral surface thereof a positioning engaging section which engages with the protrusion. Thus, the hinge mechanism for a display device is suitable for use in a hinge mechanism for a display device or the equivalent to be employed for a rear seat occupant in a passenger car in recent years.

The invention claimed is:

1. A hinge mechanism comprising: a cylindrical holder which encloses an outer peripheral portion of a shaft; a protrusion provided on the internal surface thereof the protrusion having a surface area in an arc shape;
   a positioning engaging section, provided on the outer peripheral surface of the shaft which engages with the protrusion,
   wherein the protrusion provides the only contact by the cylindrical holder with the shaft.

2. The hinge mechanism for a display device according to claim 1, wherein the positioning engaging section includes a flat portion formed on the outer peripheral surface of the shaft.

* * * * *